United States Patent
Nabel et al.

(10) Patent No.: US 11,351,920 B2
(45) Date of Patent: Jun. 7, 2022

(54) EXTERIOR MIRROR DEVICE FOR A MOTOR VEHICLE, AND MOTOR VEHICLE

(71) Applicant: VOLKSWAGEN AKTIENGESELLCHAFT, Wolfsburg (DE)

(72) Inventors: Robert Nabel, Oschersleben (DE); Mathias Hähnel, Jembke (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 216 days.

(21) Appl. No.: 16/534,299

(22) Filed: Aug. 7, 2019

(65) Prior Publication Data
US 2020/0047672 A1    Feb. 13, 2020

(30) Foreign Application Priority Data
Aug. 7, 2018   (DE) .................... 10 2018 213 221.6

(51) Int. Cl.
*B60R 1/12*   (2006.01)
*B60R 1/06*   (2006.01)

(52) U.S. Cl.
CPC ............. *B60R 1/12* (2013.01); *B60R 1/06* (2013.01); *B60R 2001/1253* (2013.01)

(58) Field of Classification Search
CPC ...... B60R 1/06; B60R 1/12; B60R 2001/1253
USPC ........................................... 359/871
See application file for complete search history.

(56) References Cited

U.S. PATENT DOCUMENTS

| | | | |
|---|---|---|---|
| 3,859,899 A * | 1/1975 | Mills .................... | B60S 1/54 454/164 |
| 4,196,930 A | 4/1980 | Busche | |
| 4,449,796 A * | 5/1984 | Janssen ................ | B60R 1/0602 359/507 |
| 4,538,851 A * | 9/1985 | Taylor .................. | B60R 1/06 296/180.1 |
| 4,981,072 A * | 1/1991 | Hanson ................ | B60H 1/248 359/838 |

(Continued)

FOREIGN PATENT DOCUMENTS

DE   27 04 226 B1   8/1978
DE   4039484 A1   12/1990
(Continued)

OTHER PUBLICATIONS

Search report for European Patent Application No. 19 19 0411, dated Nov. 11, 2019.
(Continued)

*Primary Examiner* — Ricky D Shafer
(74) *Attorney, Agent, or Firm* — Pearl Cohen Zedek Latzer Baratz LLP

(57) ABSTRACT

An exterior mirror device for a motor vehicle comprises a mirror housing in which at least one mirror element and/or one camera sensor is/are arranged, comprising a mirror base which supports the mirror housing at one end and is or can be attached to the motor vehicle at the other end, and comprising at least one baffle element for influencing the air flow along the exterior mirror device. It is provided that the baffle element on the base of the mirror is designed so that it ends at a right angle to the peel-away edge of the air flow on the base of the mirror at the peel-away edge.

8 Claims, 2 Drawing Sheets

(56) References Cited

U.S. PATENT DOCUMENTS

| | | | |
|---|---|---|---|
| 5,903,389 A | 5/1999 | Rumez et al. | |
| 6,386,712 B1* | 5/2002 | Warner | B60R 1/06 359/507 |
| 6,712,413 B1* | 3/2004 | Flowerday | B60R 1/06 248/476 |
| 9,457,721 B2* | 10/2016 | Takahashi | B60R 1/06 |
| 10,829,049 B2* | 11/2020 | Wolf | B60R 1/0602 |
| 2003/0026008 A1* | 2/2003 | Tanaka | B60R 1/06 359/838 |
| 2004/0056511 A1 | 3/2004 | Flowerday | |
| 2015/0266425 A1 | 9/2015 | Takahashi et al. | |

FOREIGN PATENT DOCUMENTS

| | | |
|---|---|---|
| DE | 10 2005 019 778 A1 | 11/2006 |
| DE | 10 2010 017 373 A1 | 12/2011 |
| EP | 1 787 862 A1 | 5/2007 |
| EP | 2 921 351 A1 | 9/2015 |
| JP | 2015-178315 A | 10/2015 |
| KR | 100808697 B1 | 2/2008 |

OTHER PUBLICATIONS

Office Action for Korean Patent Application No. 10-2019-0095327, dated Jun. 25, 2020.

Search report for German Patent Application 10 2018 213 221.6, dated Feb. 28, 2019.

\* cited by examiner

EXTERIOR MIRROR DEVICE FOR A MOTOR VEHICLE, AND MOTOR VEHICLE

CROSS REFERENCE TO RELATED APPLICATION

This application claims priority from German Patent Application No. 10 2018 213 221.6, filed Aug. 7, 2018, which is hereby incorporated by reference.

FIELD OF THE INVENTION

The present invention relates to an exterior mirror device for a motor vehicle, comprising a mirror housing in which there is a mirror element and/or at least one camera sensor, comprising a mirror base, which supports the mirror housing at one end and, at the other end, is or can be attached to the motor vehicle, and comprising at least one baffle element for influencing, in particular improving, the air flow on the exterior mirror device.

In addition, the present invention relates to a motor vehicle having such an exterior mirror device.

BACKGROUND OF THE INVENTION

An exterior mirror device is disclosed in Unexamined German Patent Application DE 10 2010 017 373 A1, for example, which discloses a mirror housing, in which a mirror is arranged adjustably and has a mirror base by means of which the mirror housing is arranged on the outside edge of the motor vehicle. In addition, an air baffle element is provided for the mirror housing and is optionally also adjustable to deflect an air current in the direction of the mirror in order to free it of any water droplets that might optionally be present on it.

Another exterior mirror device is known from U.S. Pat. No. 5,903,389 B1, in which multiple air baffle elements are provided on the mirror housing in order to achieve an improved separation of air flow during vehicle operation as well as to improve noise abatement.

SUMMARY OF THE INVENTION

The object of the present invention is to create an improved exterior mirror device in which the flow behavior of air is further improved during vehicle operation, in particular with the flow noises and wind resistance being reduced.

The object on which the present invention is based is achieved by an exterior mirror device having the features as claimed. This has the advantage that separation of the flow due to eddies at the base of the mirror is reduced or prevented. According to the present invention, this achieves the result that the baffle element is formed at the base of the mirror in such a way that it ends at the peel-away edge at the base of the mirror at a right angle to the peel-away edge of the flow. The baffle element thus extends along the base of the mirror, such that it extends at a right angle to the peel-away edge at least in the end section in the region of the peel-away edge, so that the flow is guided at a right angle to the peel-away edge. The flow behavior at the basis of the mirror is therefore improved, and noise emission is reduced. By arranging the baffle elements at the base of the mirror, the air flow is influenced in particular in the area close to the vehicle body and/or the body of the vehicle, so that noises occurring on the body of the vehicle due to the air flow in particular are prevented or at least reduced.

According to a preferred refinement of the present invention, multiple baffle elements designed to run parallel to one another are provided on the base of the mirror. Depending on the size of the base of the mirror, i.e., the longitudinal extent from the motor vehicle to the mirror housing, the number of baffle elements is reduced or increased in such a way that the number of baffle elements is also increased with an increase in length. It is therefore possible to ensure, on the basis of the longitudinal extent of the base of the mirror, that there is advantageous guidance of the air flow.

According to a preferred refinement of the present invention, the respective baffle element, i.e., at least one baffle element, or multiple baffle elements are each designed in one piece with the base of the mirror, in particular with the housing of the base of the mirror. This ensures that the respective baffle element will advantageously be integrated into the base of the mirror, which prevents subsequent mounting in particular. Alternatively, the respective baffle element is designed as a separate element and is attached to the housing at the base of the mirror.

In addition, it is advantageously provided that the respective baffle element is designed as a web element protruding away from the base of the mirror. The respective baffle element therefore protrudes away from the base of the mirror and allows advantageous air flow guidance to be manifested inexpensively.

Alternatively, the respective baffle element is designed as a groove-shaped recess in the base of the mirror, so that the air is guided through the groove-shaped recess. The groove-shaped recess expediently ends with an open edge at the peel-away edge of the base of the mirror. The peel-away edge can be determined in advance by calculations and/or experiments, for example, or may be designed into the structure.

According to a preferred refinement of the present invention, the respective baffle element has at least one curved section in its longitudinal extent, in particular to act as an eddy current generator. This curvature achieves the result that the direction of air flow changes so that eddy currents in particular occur at the peel-away edge and lead to an improved separation behavior, in particular in the area of the peel-away edge. This is the case in particular when the peel-away edge does not extend at a right angle to the direction of travel. The peel-away edge preferably does not extend at a right angle to the direction of air flow in the direction of travel but instead runs obliquely to the normal direction of air flow so that the base of the material can be designed and constructed optimally for supporting the mirror housing. In particular the base of the mirror is designed to be inclined as a whole in order to optimize the load-bearing capacity of the base of the mirror.

In addition, it is preferably provided that the respective baffle element begins in parallel with an air flow direction at the base of the mirror. In particular due to the curvature, the air flow direction is then deflected from the normal direction of flow into the different direction of flow perpendicular to the peel-away edge in order to achieve the advantageous flow behavior. Due to the fact that the respective baffle element is aligned in the normal direction of air flow at the beginning, this ensures an advantageous reception for the air volume and/or the airstream with low noise emission and low resistance.

According to a preferred refinement of the present invention, at least one baffle element is arranged on the top side and/or on the bottom side of the base of the mirror. The respective baffle element is usually invisible to the user when the baffle element is on the bottom: this improves the visual impression. In addition, this prevents a buildup of ice or snow, for example, on the top of the base of the mirror from interfering with the function of the baffle elements, for example. Multiple baffle elements are preferably arranged on the top side and the bottom side.

In addition, it is preferably provided that the base of the mirror is designed, as already mentioned above, to run at an inclination from the motor vehicle to the mirror housing on the motor vehicle in order to achieve certain mechanical advantages which will ensure a robust mounting of the mirror housing even at high air flow velocities. One result of this in particular is that the peel-away edge of the base of the mirror does not extend vertically but instead runs at an inclination to the direction of air flow when driving straight ahead and/or at an inclination to the direction travel or the longitudinal extent of the motor vehicle.

The motor vehicle according to the present invention is characterized by the design of the mirror device according to the present invention. This yields the advantages already mentioned above.

BRIEF DESCRIPTION OF THE DRAWINGS

Additional advantages and preferred features and combinations of features are derived in particular from what was described above as well as from the claims. The present invention will now be explained in greater detail below. In the drawings:

DETAILED DESCRIPTION OF THE INVENTION

Figure 1:
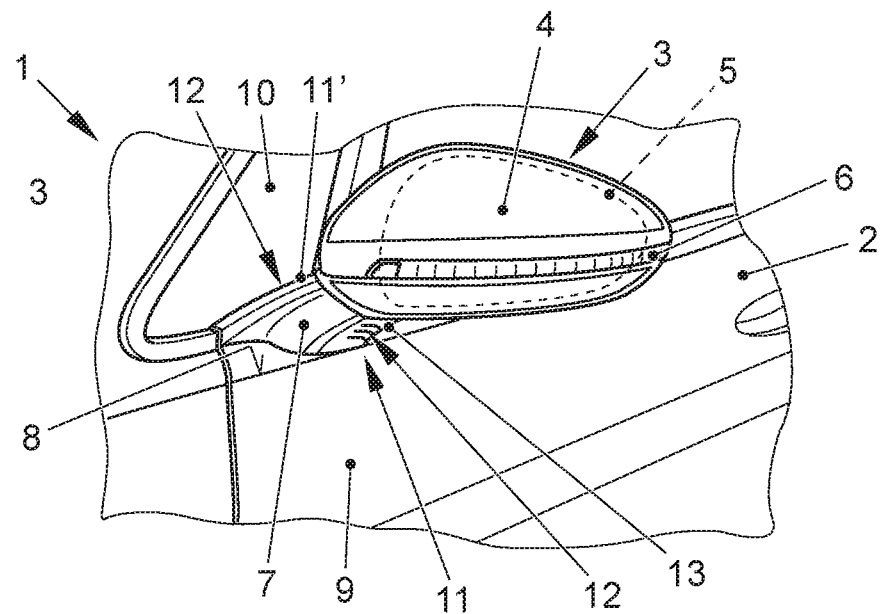
FIG. 1 shows a motor vehicle having an advantageous mirror device in a simplified detailed diagram.

FIG. 1 shows in a perspective diagram a section of a motor vehicle 1, having an exterior mirror device 3 in the area of a front vehicle door 2. The exterior mirror device 3 has a mirror housing 4, which carries a mirror 5, which serves as the exterior mirror for the driver of motor vehicle 1 and is shown only with dashed lines in FIG. 1. The mirror housing 4 is designed with flow optimization and also has a controllable LED strip 6, which is used as a turn indicator light, for example.

The mirror housing 4 is mounted on the body 8 of the motor vehicle 1 at the base 7 of the mirror. In this case, the body 8 of the vehicle is formed by a paneling part 9 of the vehicle door 2. The base 7 of the mirror sits on the body of the vehicle but is preferably attached permanently to a chassis element arranged beneath the body 8 and/or the paneling part 9. In the present case, the base 7 of the mirror sits directly beneath a window 10 on the paneling part 9.

The base 7 of the mirror is designed to extend at an inclination from its end that faces the vehicle door 2 to the mirror housing 4, such that the end facing the vehicle door 2 protrudes in the direction of travel, so that an aerodynamically advantageous design of the exterior mirror device 3 is provided, ensuring a great sturdiness in particular.

The base 7 of the mirror has multiple baffle elements 12 on the bottom side 11 facing the road surface and on the top side 11' facing away from the bottom side 11, such that these baffle elements are advantageously used to guide the air flow created by the driving-induced airstream to prevent wind sounds and eddy currents.

Figure 2:
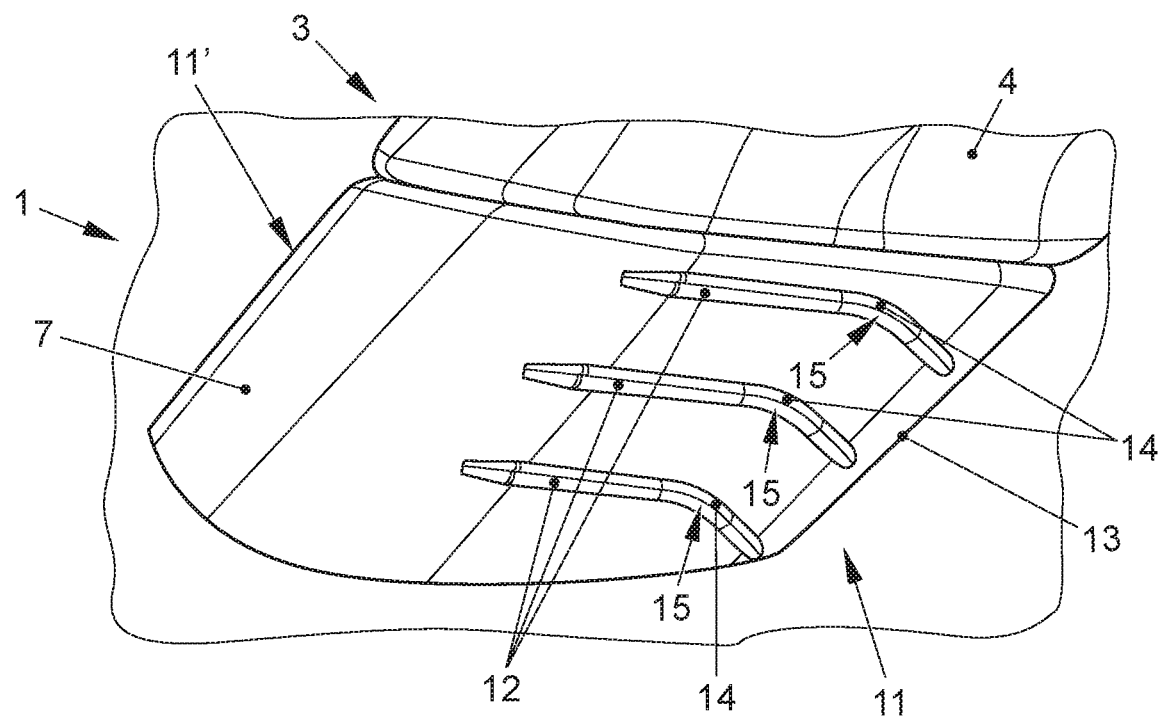
FIG. 2 shows a perspective detailed diagram of a first embodiment of the mirror device.

FIG. 2 shows a detailed perspective view of the bottom side 11 of the base 7 of the mirror. In the present case, the base 7 of the mirror has three baffle elements 12 extending along the bottom side 11 in the direction of a peel-away edge 13 of the base 7 of the mirror. The baffle elements 12 are each designed as web elements 14. The baffle elements 12 extend parallel to one another, each having a curved section 15. This achieves the result that the baffle elements 12 at the front or at the start in the direction of flow extend parallel to the normal direction of flow of the airstream as the motor vehicle 1 moves forward, and at the end facing the peel-away edge 13, the flow elements extend at a right angle to the peel-away edge 13. The baffle elements 12 on the top side 11' are designed accordingly.

The airstream is therefore deflected at a right angle to the peel-away edge 13 on the bottom side 11 of the base 7 of the mirror, so that the cW value, i.e., the drag coefficient, of the exterior mirror device 3 and sound emissions by the base 7 of the mirror in particular are reduced to a level corresponding approximately to the level of a mirror base that is not designed with an inclined peel-away edge 13 and/or an inclined design of the base 7 of the mirror, as in the present case.

As an alternative to the embodiment of the baffle elements 12 shown here as web elements 14, it is also conceivable for the baffle elements 12 to be designed as groove-shaped indentations on the bottom side 11 of the base 7 of the mirror.

Figure 3:
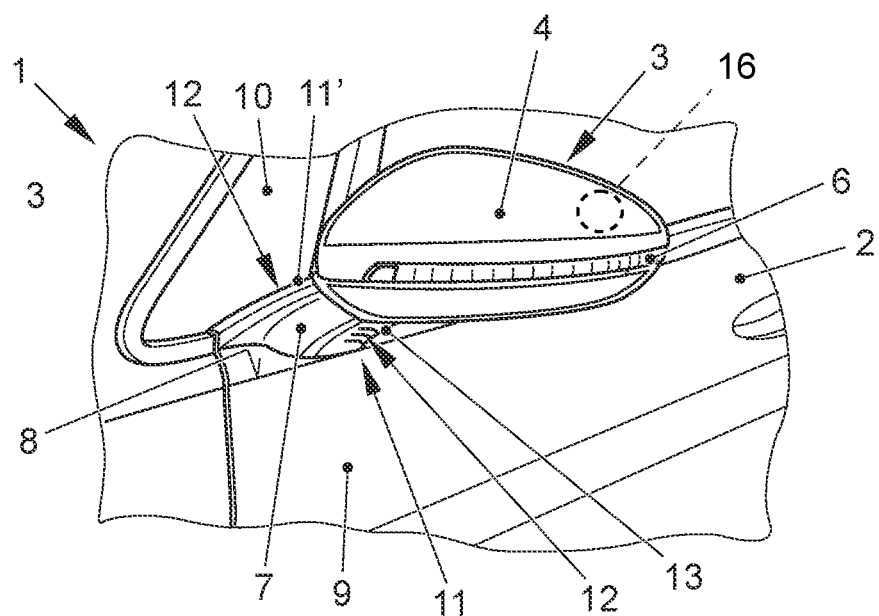
FIG. 3 shows a perspective detailed diagram of a second embodiment of the mirror device.

As an alternative to the embodiment described above, as shown in FIG. 3, a camera sensor 16 is provided instead of a mirror element 5 in the mirror housing 4, so that the exterior mirror device 3 forms a digital exterior mirror device 3', which has in particular a display device for displaying, in particular in the interior of the motor vehicle, the image of the surroundings of the motor vehicle captured by the camera sensor 16.

LIST OF REFERENCE NUMERALS 1 motor vehicle
2 vehicle door
3 exterior mirror device
4 mirror housing
5 mirror element
6 LED strip
7 mirror face
8 body
9 handling part
10 window
11 bottom side
11' top side
12 baffle element
13 peel-away edge
14 web element
15 section

The invention claimed is:

1. An exterior mirror device for a motor vehicle, comprising:
a mirror housing, in which at least one mirror element/or one camera sensor is/arranged, comprising:
a mirror base which supports the mirror housing at one end and is or can be attached to the motor vehicle at the other end, and
at least one baffle element for influencing an air flow on the exterior mirror device, wherein the at least one baffle element at the mirror base is designed so that it ends at a peel-away edge of the air flow at the mirror base, forming a right angle to the peel-away edge, and wherein the mirror base is design to run at an incline from the motor vehicle to the mirror housing on the motor vehicle in such a way that the peel-away edge runs at an inclination to the longitudinal extent of the vehicle.

2. The exterior mirror device according to claim 1, further comprising at least two baffle elements that are designed to run parallel to one another are arranged at the base of the mirror.

3. The exterior mirror device according to claim 1, wherein the at least one baffle element is designed in one piece with the base of the mirror.

4. The exterior mirror device according to claim 1, wherein the at least one baffle element is designed as a web element protruding away from the base of the mirror.

5. The exterior mirror device according to claim 1, wherein the at least one baffle element has at least one curved section in its longitudinal extent.

6. The exterior mirror device according to claim 1, wherein the at least one baffle element begins parallel to a normal direction of air flow at the base of the mirror.

7. The exterior mirror device according to claim 1, wherein the at least one baffle element is arranged on the bottom side or/on the top side of the base of the mirror.

8. A motor vehicle having at least one exterior mirror device disposed on its shell, wherein the exterior mirror device is designed according to claim 1.

* * * * *